United States Patent [19]

McGee

[11] Patent Number: 4,875,408
[45] Date of Patent: Oct. 24, 1989

[54] BEVERAGE MAKER FOR USE IN AUTOMOTIVE VEHICLES

[76] Inventor: Frank C. McGee, 1930 Port Dunleigh, Newport Beach, Calif. 92660

[21] Appl. No.: 315,828

[22] Filed: Feb. 27, 1989

[51] Int. Cl.$^4$ .............................................. A47J 31/00
[52] U.S. Cl. ...................... 99/283; 99/295; 99/299; 99/307; 426/77; 426/433
[58] Field of Search ............... 99/279, 295, 299, 300, 99/302 R, 304, 307, 280, 283, 275; 426/433, 77

[56] References Cited

U.S. PATENT DOCUMENTS

| | | | |
|---|---|---|---|
| 3,384,004 | 5/1968 | Perlman | 99/302 R |
| 3,445,237 | 5/1969 | Gidge | 99/295 |
| 3,446,624 | 5/1969 | Luedtke | 426/77 |
| 3,450,024 | 6/1969 | Martin | 99/295 |
| 3,561,349 | 2/1971 | Endo | 99/307 |
| 4,446,158 | 5/1984 | English | 426/77 |

Primary Examiner—Robert W. Jenkins
Attorney, Agent, or Firm—Philip D. Junkins

[57] ABSTRACT

A beverage maker system for installation and use in automotive vehicles including an improved beverage-brewing chamber. The beverage-brewing chamber has an upper brewing chamber area for receiving heated water from a water heater and a lower brewing chamber area for receiving a disposable brew basket. The brew basket holds a filter-like pouch containing powdered or granular beverage making material and the brew basket includes a central top opening for receiving heated water from the upper chamber area, an annular side wall, and a bottom wall having a multiplicity of fluid flow perforations. The bottom wall of the brew basket also includes a central depressed closure portion for seating in and closing a bottom aperture of the beverage-brewing chamber. Shape-memory members of initially reduced height are located within the lower brewing chamber area below the brew basket and are positioned around the closure portion of the bottom wall of the basket. The shape-memory members are expandable in height upon being heated to a predetermined temperature by hot beverage flowing from the fluid flow perforations in the bottom wall of the brew basket whereby the bottom wall is lifted by the expanding shape-memory members and the closure portion of the bottom wall is unseated from the aperture of the beverage-brewing chamber thereby permitting the flow of hot beverage from such chamber to a beverage drinking cup.

11 Claims, 2 Drawing Sheets

BEVERAGE MAKER FOR USE IN AUTOMOTIVE VEHICLES

BACKGROUND OF THE INVENTION

The present invention relates to a device for making hot beverages and soups. More particularly, this invention relates to a system for making hot beverages such as coffee, tea, hot chocolate and the like, and hot soups, from prepackaged ground, instant or powdered forms of such beverages and soups and adaptable for use in an automotive vehicle or the like.

Portable coffee makers for making one or more entire multi-cup pots of coffee have become commonly used in the home, office and eating establishments. However, the capability of brewing coffee or preparing other hot beverages and soups in automotive vehicles has not become satisfactorily established. It has not been practical for the operator of a vehicle to have to measure out coffee, tea or chocolate granules or powder and water and deposit same in a hot beverage maker while driving the vehicle. Usually the driver only desires one or two cups of the beverage or soup at a time. Further, the driver usually desires that the beverage or soup be heated or brewed quickly and without distraction to the driving functions. Thus, the single-cup or dual-cup hot beverage making process has not been satisfactorily expanded for use and operation in a moving vehicle.

It is a principal object of the present invention to provide a hot beverage or soup maker which is readily adaptable for use in an automotive vehicle.

It is another object of the present invention to provide a hot beverage maker or hot soup maker which utilizes prepackaged ground coffee, instant coffee, instant tea, instant chocolate, instant soup and the like, preferably in a limited quantity, to minimize distraction of the operator of the vehicle within which the beverage maker is mounted.

It is a further object of the invention to provide a hot beverage or soup maker for ready installation in an automotive vehicle which utilizes a single disposable brew basket within a beverage or soup brewing or heating chamber including means to maintain adequate water residence time to yield full flavored cups of the desired beverage or soup.

It is a still further object of the invention to provide a hot beverage or soup maker for ready installation in an automotive vehicle which utilizes a beverage or soup drinking cup having closure means which is open to receive the hot beverage or soup upon insertion of the cup into the beverage or soup maker below its brewing or heating chamber.

It is yet another object of the present invention to provide a hot beverage or soup maker for ready installation in an automotive vehicle which is operable by electric current supplied by the vehicle battery and in which the heating cycle for heating water for the beverage brewing or soup heating is initiated only upon insertion of a cup of special and unique design into the beverage or soup maker in an orientation such that the cup is open to receive hot beverage or soup from the brewing or heating chamber of the beverage or soup maker.

Other objects and advantages of the invention will become apparent from the following summary and detailed description of preferred embodiments of the invention taken in conjunction with the accompanying drawing figures.

SUMMARY OF THE INVENTION

The present invention relates to a hot beverage and hot soup maker which is readily adaptable for safe and efficient use in an automotive vehicle. The beverage or soup maker includes as its principal components: a water heating chamber; a water heater and control unit; a beverage or soup brewing or heating chamber; and an insertable beverage or soup drinking cup. The heating chamber and the water heater and control unit are of well-known design for the safe and efficient heating of one or more cups of water with automatic cut-off when the heated water has been transferred to the brewing or heating chamber and/or when either the brewing chamber or the beverage or soup cup is removed from the beverage or soup maker or improperly inserted therein. The insertable brewing chamber utilizes a single use disposable brew basket containing an appropriate quantity of prepackaged ground coffee, instant coffee, instant tea, powdered chocolate, instant soup or the like, and the brewing chamber has built-in means for sealing its fluid outlet via the brew basket for a time and to the extent that the heated water passing through the chamber is maintained in residence within the chamber in contact with the ground, instant or powered beverage or soup material so that the resulting cup of freshly prepared beverage or soup is hot and full-flavored.

The insertable beverage or soup drinking cup is of insulated design with its removable top shaped for spill-proof receipt of hot beverage or soup from the brewing chamber and for spill-proof drinking of the beverage or soup contained therein by the vehicle operator. The beverage cup has a top closure means which is operated to its open position upon appropriate alignment and insertion of the cup into the beverage maker during the brewing procedure and which when held in the vehicle operator's hand provides drinking access to its beverage contents. The insertable cup and insertable brewing chamber are readily cleanable after use and the cup may provide the means for loading the water heating chamber with the appropriate amount of water for use in the beverage maker.

BRIEF DESCRIPTION OF THE DRAWING FIGURES

The invention may take physical form in a variety of arrangements of the principal parts and sub-systems. Although the invention is applicable to the preparation of one or more cups of coffee, tea, hot chocolate, soup and the like, it is described herein after in terms of apparatus and a system for brewing a single cup of coffee, a preferred embodiment of which is described in detail in this specification and illustrated in the accompanying drawings which form a part hereof.

DETAILED DESCRIPTION OF THE PREFERRED EMBODIMENTS

Figure 1:
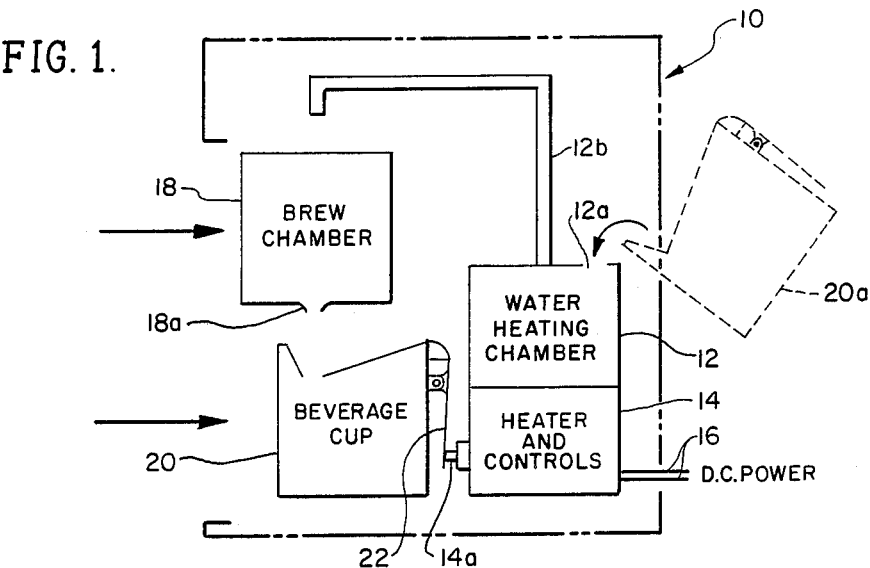
FIG. 1 is a diagrammatic presentation of the principal components of the apparatus of the present invention.

Referring initially to FIG. 1, there is illustrated in diagrammatic fashion the principal components of the beverage making apparatus and system of the present invention, described in terms of the brewing of a single cup of coffee and adaptable for use in an automotive vehicle. The coffee maker system 10 is comprised of: a water heating chamber 12 in close physical and operative association with a water heater and control unit 14. The water heating chamber and water heater and control apparatus components of the system are of well-known design for the safe and efficient heating of water with electric current supplied to the heater and control apparatus through conductors 16 connected directly to the vehicle's battery or through plug connection to the battery through the vehicle's cigarette lighter.

Figure 2:
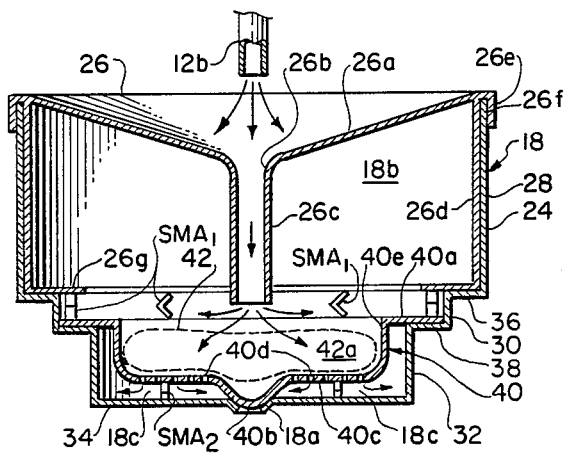
FIG. 2 is a side sectional view of the beverage brewing chamber of the apparatus of the invention with a single use disposable brew basket in its initial seated position within such chamber.
Figure 4:
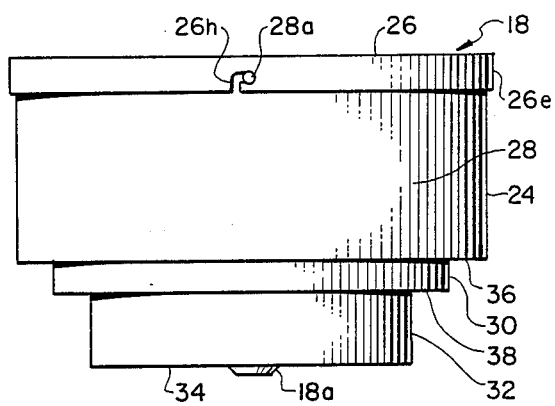
FIG. 4 is an external side view of the beverage brewing chamber of FIGS. 2 and 3.
Figure 3:
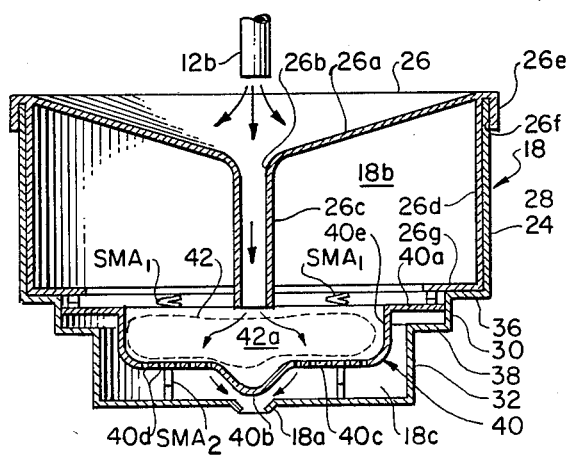
FIG. 3 is a side sectional view of the beverage brewing chamber with the single use disposable brew basket in its lifted position for release of brewed beverage from the chamber for deposit in the drinking cup associated with the apparatus of the invention.
Figure 8:
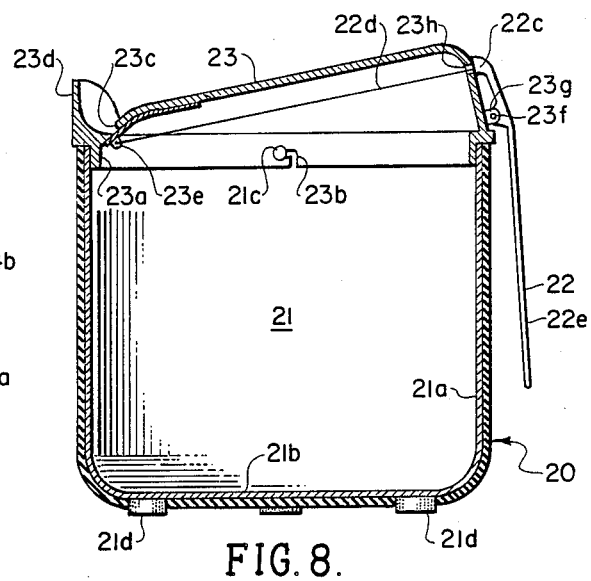
FIG. 8 is a side sectional view of the beverage drinking cup associated with the apparatus of the invention.
Figure 9:
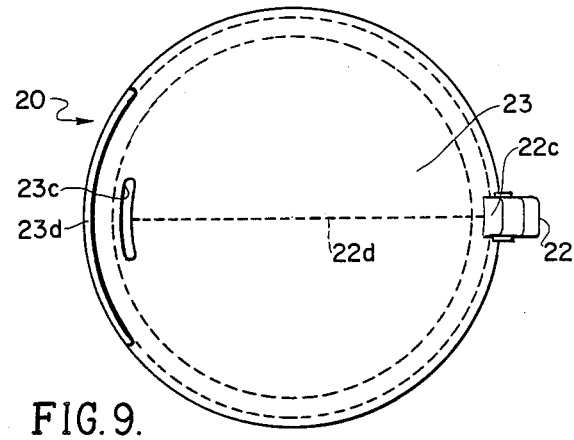
FIG. 9 is a top view of the beverage drinking cup of FIG. 8.
Figure 10:
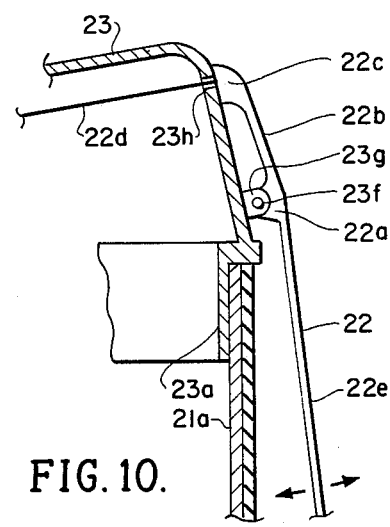
FIG. 10 is an enlarged partial sectional view of the beverage drinking cup of FIG. 8.

The coffee maker system 10 of the invention includes provision for the insertion, upon proper alignment, of a coffee brewing chamber 18, a preferred design of which is illustrated in FIGS. 2, 3 and 4 and described in detail hereinafter. The coffee maker system also includes provision for the insertion, upon proper alignment, of a beverage drinking cup 20 below brewing chamber 18 for receipt of one or more cups of brewed coffee from such chamber. A preferred design for the beverage drinking cup 20 is illustrated in FIGS. 8, 9 and 10 and described in detail hereinafter. As diagrammatically illustrated in FIG. 1, water is introduced into the coffee maker system 10 through a water fill port 12a of the water heating chamber 12 via beverage cup 20 (shown in phantom outline as cup 20a). After water fill of heating chamber 12, and with coffee brewing chamber 18 and beverage cup 20 in proper position and alignment within the system 10, the handle 22 of cup 20 actuates start button 14a of the water heater and control unit 14. The cup measured quantity of hot water from water heating chamber 12 passes through an appropriate conduit means 12b for discharge into coffee brewing chamber 18 where, after proper residence time in contact with the ground coffee or instant coffee within the brew basket of such chamber, hot coffee is brewed and released from the chamber 18 for flow via flared orifice 18a into cup 20.

As previously indicated, the insertable coffee brewing chamber 18 is shown in detail in the side cross sectional views of FIGS. 2 and 3 of the drawings. Referring to FIG. 2, the brewing chamber 18 is comprised of an outer canister 24, of circular configuration, and a mating cover unit 26. The circular canister includes a principal upper annular side wall 28, lower annular side walls 30 and 32 of progressively reduced diameter, and a circular bottom wall 34. The lower side wall 30 is joined to the annular bottom edge of upper side wall 24 by an annular ring-shaped wall 36 and the lower side wall 32 is joined at its annular upper edge to the lower annular edge of side wall 30 by an annular ring-shaped wall 38. Thus, there is provided in the lower portion of the canister 24 two annular steps defined by ring-shaped walls 36 and 38 of progressively decreased diameter, respectively. The bottom wall 34 of the canister 24 contains a central, downwardly-flared orifice 18a from which hot brewed coffee exits brewing chamber 18 as described hereinafter.

The mating canister cover 26 of the coffee brewing chamber 18 includes a top wall portion 26a of downward and inward conical configuration which terminates in its center area in an orifice 26b with a connected downwardly depending water conduit portion 26c. The canister cover 26 also includes a downwardly extending peripheral side wall portion 26d which (when the cover 26 is applied to canister 24) closely interfits within annular side wall 28 of the canister. Further, the canister cover 26 includes an upper peripheral lip portion 26e which forms an annular channel 26f into which the upper edge of canister side wall 28 seats upon closure of the canister 24. Also, the canister cover 26 is provided with an inwardly projecting annular ring portion 26g at the lower edge of its side wall portion 26d. The upper periphery of the annular canister side wall 28 is provided with means for interacting with the canister cover 26 to lock such cover to the canister side wall. As shown in FIG. 4 such lock means my comprise two or more lock pins 28a mounted to side walls 28 in peripheral spaced arrangement which are, upon full seating of cover 26 on the canister 24 followed by a slight turn of the cover, held in mating lock slots 26h (of known design) in lip portion 26e of the cover. Other appropriate lock means of known design may be provided to secure canister cover 26 to canister side wall 28.

The inwardly projecting annular ring portion 26g (at the lower edge of side wall 26d of cover 26) bears a number of peripherally spaced shape-memory alloy members $SMA_1$ which, as shown in FIG. 2, are of extended height. Shape-memory alloy devices are mechanical structures (alloy bars, springs, etc.) which radically change their shape from a deformed shape at a low temperature to a predetermined shape at a higher temperature with shape reversal as the structures are cycled between the low and high temperature points. This "shape-memory effect" or "mechanical recall" of alloy structures has been particularly noted when the structures are composed of equal parts of nickel and titanium. In such alloy and other similarly acting alloys, the "shape-memory effect" results from a crystal-structure change known as a reversible phase transformation. When cooled below its critical low temperature, the austenitic cubic structure of the alloy part or structure undergoes a shear transformation into a twinned (parallelogram-like) martensitic lattice structure. The twinned structure can be deformed without causing permanent damage to the part. When the temperature of the part is raised to its critical higher temperature, the alloy reverts to its original shape.

The heightened (extended) $SMA_1$ members, as shown in FIG. 2, bear (apply pressure) on the peripheral edge portion 40a of a disposable brew basket 40 located in the brewing chamber 18 and such members (low temperature state) hold the brew basket 40 in its lowered orientation whereby the central depressed hub portion 40b of such basket is pressed into sealing contact with the bottom orifice 18a of the brewing chamber. It is to be noted that the bottom wall 40c of brew basket 40 contains a multiplicity of fluid flow perforations 40d, the purpose of which will be explained in detail hereinafter. The circular bottom wall 34 of canister 24 of the brewing chamber 18 also bears a number of peripherally spaced shape-memory alloy members $SMA_2$ which, as shown in FIG. 2 are of compressed height (in their low temperature state) and merely approach contact with bottom wall 40c of the brew basket 40.

The brew basket 40 includes a central top opening 40e and has positioned therein a sealed filter-like pouch or bag 42 containing ground, instant or granular coffee (or other powdered or granular beverage making material) in an amount sufficient to make one cup of brewed coffee (or other beverage). The pouch or bag 42 is designed so that it covers the fluid flow perforations 40d in the bottom wall 40c of the disposable brew basket 40 whereby hot water flowing into the brew basket from the downwardly depending water conduit 26c (in the brewing chamber area 18b above the open brew basket 40 flows through pouch or bag 42 to and through perforations 40d. Thus, hot water flowing into and filling the brewing chamber area 18b, for the most part, passes into the pouch or bag 42 and comes into contact with the prepackaged beverage material 42a within the pouch (ground or instant coffee, instant tea, powered chocolate, instant soup or the like which, when acted upon by the hot water, will make a desired hot beverage) before the hot fluid beverage passes out of the bottom of the pouch and through the perforations 40d of the disposable brew basket 40.

As the hot water enters the brewing chamber area 18b, the extended height $SMA_1$ members carried by annular ring portion 26g are heated and upon reaching a predetermined critical high temperature close to a reduced height position as shown in FIG. 3. The brew basket 40 remains in its lower position (FIG. 2) until such time as hot beverage seeps through the bottom wall of pouch 42, through perforations 40d and builds up within lower brewing chamber area 18c thereby heating the compressed height $SMA_2$ members. After reaching a critical high temperature, the $SMA_2$ members open to an extended height (as shown in FIG. 3) thereby lifting the brew basket 40 whereby the central depressed hub portion 40b of such basket is moved upwardly from its seated sealing orientation with respect to the bottom orifice 18a of the brewing chamber 18 and hot brewed beverage may thereby flow out of the brewing chamber (via orifice 18a) to a beverage cup 20 positioned below such orifice (see FIG. 1). Alternatively, the extended height $SMA_1$ members carried by annular ring portion 26g may be replaced by peripherally spaced fixed-length posts which secure the brew basket 40 (via its peripheral edge portion 40a) into sealed position with respect to annular ring-shaped wall 38 of the canister 24 during the entire beverage preparation procedure. With such alternative structure, opening of the brewing chamber orifice 18a is accomplished solely by the extension of the height of the $SMA_2$ members upon their heating by the hot brewed beverage with the upward flexure of the bottom wall 40c of the brew basket moving the central depressed hub portion 40b of such basket out of seated position in orifice 18a.

It is to be noted that other means may be employed in the apparatus and system of the present invention for moving and shifting the position of the brew basket 40 during the beverage preparation procedure. Thus, there may be substituted for the shape-memory alloy members a number of known electro-mechanical devices and/or thermal-electro-mechanical means. Also, it should be understood that instead of shape-memory alloy members, other shape memory materials that are sensitive to heat change may be utilized in the system including shape-memory plastics and shape-memory ceramics.

Figure 5:
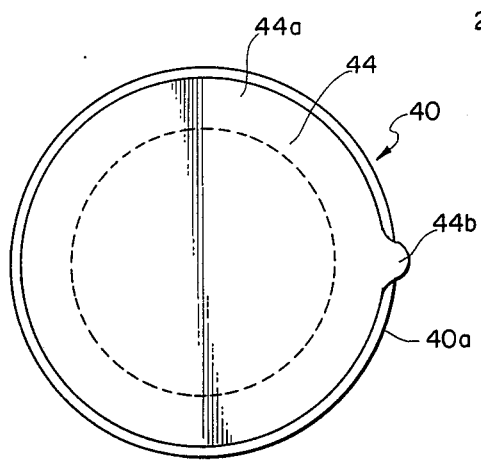
FIG. 5 is a top view of the single use disposable brew basket used in the beverage brewing chamber of the apparatus of the invention.
Figure 6:
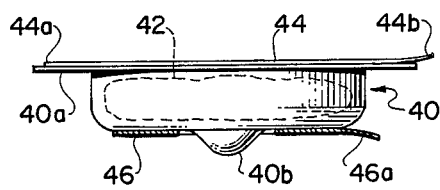
FIG. 6 is a side view of the disposable brew basket of FIG. 5.
Figure 7:
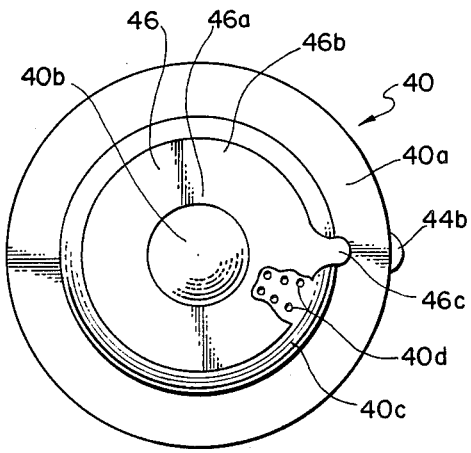
FIG. 7 is a bottom view of the disposable brew basket of FIG. 5.

The disposable brew basket 40 of FIGS. 2 and 3 is shown in its original pre-use form (prior to placement in lower brewing chamber area 18c) in FIGS. 5, 6 and 7. Such basket, with the filter-like pouch or bag 42 (containing ground, instant or granular beverage-making material) positioned therein, includes a top paper or thin plastic sheet 44 which is sealed about its peripheral area 44a by a suitable pressure-sensitive adhesive (carried by the sheet 44) to the peripheral edge portion 40a of the brew basket 40 thereby closing the central top opening 40e (FIGS. 2 and 3) of such basket and maintaining the pouch 42 therein. The top paper or plastic sheet 44 is provided with a pull tab 44b whereby such paper or plastic sheet may be easily removed from the brew basket at the time of its insertion into the lower brewing chamber area 18c.

The brew basket 40 (prior to its insertion into area 18c) also includes a bottom paper or thin flexible plastic sheet (in annulus form) 46 which is sealed about its inner and outer peripheral areas 46a and 46b, respectively, by a suitable pressure-sensitive adhesive (carried by the sheet 46) to the bottom wall 40 of the brew basket 40 thereby closing off the multiplicity of fluid flow perforations 40d in such bottom wall. The bottom paper or plastic sheet 46 is provided with a pull tab 46c whereby such paper or plastic sheet may be easily removed from the brew basket at the time of its insertion into the lower brewing chamber area 18c. The paper or plastic sheets 44 and 46, initially affixed to the brew basket 40, are vapor impermeable so that prior to use of the brew basket (during shipping and storage periods) the ground, powdered or granular beverage-making material within the filter-like pouch or bag 42 is maintained free of any moisture-bearing vapor. Alternatively, the brew basket 40 including pouch or bag 42, but without paper or plastic sealing sheets 44 and 46, may be contained (prior to use of brew basket 40 and pouch 42) within a sealed plastic bag or foil envelope that maintains the pouch or bag and its beverage-making material free of moisture-bearing vapor.

As illustrated in FIGS. 5, 6 and 7, the disposable brew basket 40 is of circular configuration. Such basket may also be of square, rectangular or ovate configuration so as to fit into brewing chambers of like configuration for incorporation in structural variations of the hot beverage maker apparatus and system of the present invention.

In FIGS. 8, 9 and 10 there is illustrated a spill-proof, hot beverage cup of a preferred design for incorporation in and use with the hot beverage maker apparatus and system for automotive vehicles as described hereinbefore. As shown in the side sectional view of FIG. 8, the hot beverage drinking cup 20 includes a beverage containing chamber 21 defined by annular side wall 21a and bottom wall 21b. The side wall and bottom wall are preferably of unitary construction comprised of an inner stainless steel shell covered by a heat insulating coating such as a closed cell foam plastic material. The cup 20 is provided with a removable top closure member 23 which includes a downwardly depending peripheral lip portion 23a which fits into the upper rim portion - of the annular side wall 21a of the cup. The cup closure member 23 may be locked to the cup's side wall 21a by two or more lock pins 21c mounted to the side wall (in spaced relationship along the upper peripheral portion of the side wall) which interact with mating lock slots 23b (of known design) in the lip portion 23a of the top closure member 23. Alternatively the top closure member 23 may be threaded in its depending lip portion 23a for locking engagement with matching threads in the upper peripheral portion of side wall 21a of the cup.

The cup closure member 23 includes a sloping top surface which terminates at its lowermost forward point in an orifice 23c for admission of a hot beverage from the brew chamber 18 (via orifice 18a) to chamber 21 of cup 20 and for drinking withdrawal of hot beverage from the the cup's beverage chamber 21. In front of the orifice 23c of the cup closure member, along a portion of the periphery of closure member 23, is a baffle 23d over which hot beverage material from chamber 21 is ingested by one drinking from cup 20. The baffle 23d, in cooperation with the sloping top surface of closure member 23, assists in the direction of brewed beverage initially into the cup and in the return of non-ingested beverage to chamber 21 of the cup through orifice 23c.

The cup top closure member 23 also includes a levered handle 22 of pivotal design which functions to open a metallic leaf valve 23e (as described hereinafter) normally biased to close orifice 23c and which handle, upon proper positioning of the cup within the coffee (beverage) maker system 10, actuates start button 14a (see FIG. 1) of the water heater and control unit 14 of the system. As shown in FIG. 8 (and in enlarged detail in FIG. 10), the cup's levered handle 22 is pivoted to closure 23 via pivot pin 23f connecting the handle 22 at its pivot portion 22a to pivot portion 23g of closure 23 at a point on the side of the closure opposite orifice 23c. The handle arm 22b terminates in an abutment portion 22c which is attached to a wire 22d (or other linkage means) which extends through a port 23h in the side wall of closure 23 to the free end of leaf valve 23e. The leaf valve which may be of either metallic material or of non-metallic material, is affixed at its inner portion to the underside of the closure top wall and normally is biased to close orifice 23c in its free end portion. Upon actuation of the handle arm 22e toward the cup body, either by the gripping hand of a person about to drink beverage from the cup or by the proper insertion of the cup into the beverage maker system, the wire 22d is pulled thereby flexing the free end of the leaf valve 23e downwardly to open orifice 23c.

The drinking cup 20 associated with the beverage maker system may be modified in structure and beverage-holding volume so-long-as the basic criterion is met of a closed drinking cup with a fluid flow cup-filling and drinking orifice which is closed by a biased valve during all periods other than when the cup is properly seated in the system during the beverage brewing and cup filling procedures and when a user grasps the cup for spill-proof beverage drinking purposes. The drinking cup 20 of the present invention may also include other features useful to an automotive vehicle operator in the safe and efficient preparation and drinking of hot fresh brewed beverages. Such features include the incorporation of the outer insulating foam plastic coating or shell on the basic stainless steel cup structure and magnetic base pods 21d which may be utilized to retain the cup within the beverage maker system during the brewing and cup filling periods and to hold the cup to metal surfaces within the vehicle when the cup is being used as the hot beverage source by the operator. It is also to be understood that instead of an inner stainless steel shell, the cup 20 may be constructed with a glass, plastic or ceramic inner shell.

In operation of the beverage maker system 10, installed within an automotive vehicle, the operator or a passenger first fills the water heating chamber 12 with one or more cups of water. As shown in FIG. 1 filling of the water heating chamber may be accomplished utilizing the drinking cup 20 as the means for supply of a measured quantity of water. The operator, or the passenger, next removes the paper or plastic protective sheets 44 and 46 from a selected disposable brew basket 40 containing a filter-like pouch or bag of ground, powdered or granular beverage-making material and places such basket in the canister 24 of the brewing chamber 18. The mating cover unit 26 is applied to the canister and locked into place thereby holding the brew basket in its lowered orientation within the brewing chamber with the bottom orifice 18a of such chamber closed by the central depressed hub portion 40b of the basket. The brewing chamber is thereafter loaded into the beverage maker system 10 in position to receive heated water from the outlet conduit means 12b of the water heating chamber 12. The empty beverage drinking cup 20 is next inserted into the beverage maker system in fluid receiving orientation with respect to the outlet of the brew chamber 18 and in appropriate alignment within the system whereby the cup's handle 22 is positioned to actuate the start button 14a of the water heater and control unit 14 and to open the fluid receiving orifice 23c in the cup's top closure member 23.

When the water in the heating chamber 12 reaches a predetermined temperature, the heated water is transfered by known means and in known manner through conduit means 12b to the brew chamber 18. The heated water within the brew chamber seeps through the filter-like pouch 42 (containing beverage-making material) in the brew basket 40 and thereafter through the fluid flow perforations 40d in the bottom wall of the brew basket to the lower brewing chamber area 18b. Below the brew basket in area 18c the hot beverage comes into heating contact with the heat sensitive $SMA_2$ members which, after reaching their critical high temperature point, lift the brew basket within the brew chamber (or, depending upon the brew chamber design, flex upwardly the bottom wall of the brew basket) thereby permitting the flow of hot brewed beverage through the bottom orifice 18a of the chamber and into the open orifice 23c of the drinking cup 20. At the time of completion of full transfer of the one cup quantity of water out of the water heater to the brew chamber, the control unit terminates energization of the heater. After full discharge of the hot brewed beverage from the brew chamber into the drinking cup, and cooling of the $SMA_2$ members, such members contract in height with the result that the brew basket returns to its lower seated position within the chamber to seal off orifice 18d of such chamber. It should be understood that the return of the brew basket to its lower seated position, to seal off orifice 18d, may be accomplished or assisted by other mechanical or electro-mechanical means. Removal of cup 20 from the confines of the beverage maker system 10 results in automatic closure of the cup's drinking orifice 23c until the person intending to drink from the cup grasps same in a manner pressing the handle 22 to the cup body.

Additional features of the apparatus and system of the present invention include provision for the placement of one or more wafers or tablets of sweetener agent and/or creamer agent in appropriate recesses in the top closure member 23 of the cup 20. Thus, as fresh hot brewed beverage (coffee or tea) is directed into the cup the wafer(s) and/or tablet(s) dissolve and the sweetener and/or creamer agent is carried into the cup in thoroughly mixed fashion. It should also be understood that the brew basket need not be of disposable design. Rather, the brew basket may be designed for reuse with the substitution of new beverage pouches or bags or the basket may be adapted to receive mixtures of beverage powder or granules blended to the personal choice and taste of the user.

From the foregoing, it should be appreciated that the operator of an automotive vehicle (or a passenger) can quickly and efficiently (without distraction from the vehicle driving functions) brew his or her own selected beverage or soup in the beverage maker of the invention. While the present invention has been described with reference to preferred embodiments thereof, it is obvious that modifications and alterations will occur to others skilled in the art upon the reading and understanding of this specification. The present invention includes all such modifications and alterations, and equivalents thereof, being limited only by the scope of the following claims.

What is claimed is:

1. In a beverage maker system for installation and use in automotive vehicles including: a water heating chamber including means for receiving a quantity of water; means for heating said water chamber and the water contained therein; a beverage-brewing chamber including beverage making material in a quantity sufficient when acted upon by hot water to make one cup of hot beverage and aperture means for dispensing hot beverage from said chamber; conduit means for directing the flow of heated water from said water chamber to said beverage-brewing chamber; means for initiating and controlling the heating of water in said water chamber to a predetermined temperature and for controlling the flow of heated water through said conduit means to said beverage-brewing chamber; and a beverage drinking cup positionable within said beverage maker system for receiving hot beverage dispensed from the beverage-brewing chamber, an improved beverage-brewing chamber comprising:

(a) an upper brewing chamber area for receiving heated water from the water heater chamber via said conduit means;
    (b) a disposable brew basket within a lower brewing chamber area, said brew basket including a central top opening for receiving heated water from said upper chamber, a bottom wall having a multiplicity of fluid flow perforations, and a filter-like pouch located within said brew basket and containing said beverage making material, the bottom wall of said brew basket includes closure means for seating in and closing the aperture means for dispensing hot beverage from the beverage-brewing chamber; and
    (c) shape-memory alloy members of initially reduced height located within said lower brewing chamber area below said brew basket, positioned around the closure means of said brew basket, and in contact with the bottom wall thereof, said shape-memory members being expandable in height upon being heated to a predetermined temperature by hot beverage flowing from the fluid flow perforations in the bottom wall of said brew basket whereby said bottom wall is lifted by said members and the closure means thereof is unseated from the aperture means of said beverage-brewing chamber thereby permitting the flow of hot beverage from said chamber to said beverage drinking cup.

2. In a beverage maker system for installation and use in automotive vehicles as claimed in claim 1 wherein the disposable brew basket, prior to its placement within the lower brewing chamber area, includes a first removable cover sheet of vapor impermeable material closing the central top opening of said basket and a second removable cover sheet of vapor impermeable material closing the fluid flow perforations in the bottom wall of said basket.

3. In a beverage maker system for installation and use in automotive vehicles as claimed in claim 1 wherein the beverage drinking cup positionable within said system includes cover means with a drinking orifice which is normally closed by a force biased leaf valve and pivotal handle means connected to said valve for actuating said valve to open said orifice to receive hot beverage dispensed from the beverage-brewing chamber and to provide drinking access to said cup.

4. In a beverage maker system for installation and use in automotive vehicles as claimed in claim 1 wherein the beverage drinking cup positionable within said system includes pivotal handle means which, when said cup is inserted within said system, actuates the means for initiating and controlling the heating of water in said water chamber and for controlling the flow of heated water through said conduit means to said beverage-brewing chamber.

5. In a beverage maker system for installation and use in automotive vehicles as claimed in claim 1 wherein the improved beverage-brewing chamber is comprised of: a canister defining in its upper portion said upper brewing chamber area and defining in its lower portion said lower brewing chamber area and having peripheral means between said upper and lower chamber areas for supporting said brew basket at its upper periphery with the body of said basket, including the enclosed filter-like pouch containing said beverage making material, supported freely within said lower brewing chamber area; and a removable canister cover including a central water inlet orifice for receiving heated water from said water heater as directed by said conduit means.

6. In a beverage maker system for installation and use in automotive vehicles including: a water heating chamber including means for receiving a quantity of water; means for heating said water chamber and the water contained therein; a beverage-brewing chamber including beverage making material in a quantity sufficient when acted upon by hot water to make one or more cups of hot beverage and bottom aperture means for dispensing hot beverage from said chamber; conduit means for directing the flow of heated water from said water chamber to said beverage-brewing chamber; means for initiating and controlling the heating of water in said water chamber to a predetermined temperature and for controlling the flow of heated water through said conduit means to said beverage-brewing chamber; and a beverage drinking cup positionable within said beverage maker system for receiving hot beverage dispensed from the beverage-brewing chamber, an improved beverage-brewing chamber comprising:

(a) an upper brewing chamber area for receiving heated water from the water heater chamber via said conduit means and a lower brewing chamber area for receiving a disposable brew basket (b) a disposable brew basket within said lower brewing chamber area, said brew basket including a top wall having a peripheral edge portion and a central top opening for receiving heated water from said upper chamber area, an annular side wall, and a bottom wall having a multiplicity of fluid flow perforations;

(c) a filter-like pouch located within said brew basket and containing said beverage making material, the bottom wall of said brew basket includes closure means for seating in and closing the bottom aperture means of the beverage-brewing chamber; and (d) shape-memory members of initially reduced height located within said lower brewing chamber area below said brew basket, positioned around the closure means of said brew basket, and in contact with the bottom wall thereof, said shape-memory members being expandable in height upon being heated to a predetermined temperature by hot beverage flowing from the fluid flow perforations in the bottom wall of said brew basket whereby said bottom wall is lifted by said members and the closure means thereof is unseated from the aperture means of said beverage-brewing chamber thereby permitting the flow of hot beverage from said chamber to said beverage drinking cup.

7. In a beverage maker system for installation and use in automotive vehicles as claimed in claim 6 wherein the improved beverage-brewing chamber is comprised of: a canister defining in its upper portion said upper brewing chamber area and defining in its lower portion said lower brewing chamber area and having peripheral ledge means between said upper and lower chamber areas for supporting said brew basket at its peripheral edge portion with the body of said basket, including the enclosed filter-like pouch containing said beverage making material, supported freely within said lower brewing chamber area; and a removable canister cover including a central water inlet orifice for receiving heated water from said water heater as directed by said conduit means.

8. In a beverage maker system for installation and use in automotive vehicles as claimed in claim 7 wherein the removable canister cover of said beverage-brewing chamber includes inwardly projecting peripheral means bearing secondary shape-memory members of initially extended height in contact with the peripheral edge portion of said brew basket for maintaining said basket and the closure means of the bottom wall thereof in seated position closing the aperture means of said beverage-brewing chamber, said secondary shape-memory members being reduced in height upon being heated to a predetermined temperature by heated water received within the upper brewing chamber area whereby said brew basket is free to move upwardly to unseat the closure means of said brew basket from the aperture means of said beverage-brewing chamber.

9. In a beverage maker system for installation and use in automotive vehicles as claimed in claim 6 wherein the disposable brew basket, prior to its placement within the lower brewing chamber area, includes a first removable cover sheet of vapor impermeable material affixed to the peripheral edge portion of said brew basket closing the central top opening of said basket and a second removable cover sheet of vapor impermeable material closing the fluid flow perforations in the bottom wall of said basket.

10. In a beverage maker system for installation and use in automotive vehicles as claimed in claim 6 wherein the beverage drinking cup positionable within said system includes removable cover means with a drinking orifice which is normally closed by a force biased leaf valve and handle means pivoted to said cover means and connected to said valve for actuating said valve to open said orifice to receive hot beverage dispensed from the beverage-brewing chamber and to provide drinking access to said cup.

11. In a beverage maker system for installation and use in automotive vehicles as claimed in claim 10 wherein the handle means pivoted to said cover means, when said cup is inserted within said system, actuates the means for initiating and controlling the heating of water in said water chamber and for controlling the flow of heated water through said conduit means to said beverage-brewing chamber.

* * * * *